(12) United States Patent
Ye et al.

(10) Patent No.: US 6,542,287 B1
(45) Date of Patent: Apr. 1, 2003

(54) OPTICAL AMPLIFIER SYSTEMS WITH TRANSIENT CONTROL

(75) Inventors: Jun Ye, Palo Alto, CA (US); Chien-Jen Chen, Cupertino, CA (US)

(73) Assignee: Onetta, Inc., Sunnyvale, CA (US)

( * ) Notice: Subject to any disclaimer, the term of this patent is extended or adjusted under 35 U.S.C. 154(b) by 0 days.

(21) Appl. No.: 09/816,131

(22) Filed: Mar. 26, 2001

Related U.S. Application Data
(60) Provisional application No. 60/254,577, filed on Dec. 12, 2000.

(51) Int. Cl.[7] .................. H01S 3/30; H01S 3/131; H04B 10/02
(52) U.S. Cl. .............. 359/334; 359/341.4; 359/337.11; 359/177
(58) Field of Search ................ 359/337.11, 341.4, 359/341.41, 341.42, 126, 177, 334

(56) References Cited

U.S. PATENT DOCUMENTS

| | | | | |
|---|---|---|---|---|
| 4,991,229 A | * | 2/1991 | Nelson et al. | 356/126 |
| 5,245,690 A | | 9/1993 | Aida et al. | 385/142 |
| 5,374,973 A | * | 12/1994 | Maxham et al. | 359/177 |
| 5,513,029 A | | 4/1996 | Roberts | 359/177 |
| 5,633,749 A | * | 5/1997 | Shibuya | 359/177 |
| 5,745,283 A | | 4/1998 | Inagaki et al. | 359/341 |
| 5,812,710 A | | 9/1998 | Sugaya | 385/27 |
| 5,825,520 A | * | 10/1998 | Huber | 359/130 |
| 5,835,260 A | * | 11/1998 | Kosaka et al. | 359/134 |
| 5,864,423 A | * | 1/1999 | Kosaka | 359/134 |
| 5,896,211 A | * | 4/1999 | Saeki | 359/341.42 |
| 5,900,969 A | | 5/1999 | Srivastava et al. | 359/341 |
| 5,959,766 A | * | 9/1999 | Otterbach et al. | 359/161 |
| 6,049,413 A | | 4/2000 | Taylor et al. | 359/337 |
| 6,061,171 A | | 5/2000 | Taylor et al. | 359/341 |
| 6,094,298 A | | 7/2000 | Luo et al. | 359/346 |
| 6,115,174 A | * | 9/2000 | Grubb et al. | 359/334 |
| 6,144,485 A | | 11/2000 | Sugaya et al. | 359/337 |
| 6,163,399 A | | 12/2000 | Berg | 359/341 |
| 6,166,850 A | | 12/2000 | Roberts et al. | 359/341 |
| 6,188,508 B1 | * | 2/2001 | Horiuchi et al. | 359/334 |

(List continued on next page.)

FOREIGN PATENT DOCUMENTS

| | | | |
|---|---|---|---|
| EP | 0 637 148 A1 | * | 2/1995 |
| EP | 0 734 105 A2 | | 9/1996 |
| WO | WO 97/10658 | * | 3/1997 |
| WO | 97/28584 | | 8/1997 |
| WO | 00/41346 A1 | | 7/2000 |

OTHER PUBLICATIONS

Hayee et al. "Transmission Penalties Due to EDFA Gain Transients in Add–Drop Multiplexed WDM Networks." IEEE Photonics Tech. Lett. 11:7, Jul. 1999. pp. 889–891.*

(List continued on next page.)

*Primary Examiner*—Thomas H. Tarcza
*Assistant Examiner*—Andrew R. Sommer
(74) *Attorney, Agent, or Firm*—Fish & Neave; G. Victor Treyz

(57) ABSTRACT

Optical amplifier equipment is provided for wavelength-division-multiplexing optical communications links that support multiple channels operating at different wavelengths. The optical amplifier equipment may be based on distributed or discrete Raman amplifiers, rare-earth-doped fiber amplifiers such as erbium-doped fiber amplifiers, or other suitable amplifiers. Optical signals on the link may be monitored using optical monitoring equipment. The optical power of the signals on a particular channel or channels that are always present on the link may be measured. The total power of the optical signals may also be measured. The pump power in the amplifier equipment may be adjusted to suppress gain transients. The pump power may be adjusted based on the measured power of the guaranteed signals. Pump power may also be adjusted based on the measured total power.

15 Claims, 13 Drawing Sheets

U.S. PATENT DOCUMENTS

| | | | | |
|---|---|---|---|---|
| 6,198,572 | B1 | 3/2001 | Sugaya et al. | 359/337 |
| 6,229,631 | B1 * | 5/2001 | Sato et al. | 359/110 |
| 6,236,499 | B1 | 5/2001 | Berg et al. | 359/341 |
| 6,246,514 | B1 * | 6/2001 | Bonnedal et al. | 359/124 |
| 6,282,017 | B1 * | 8/2001 | Kinoshita | 359/161 |
| 6,344,922 | B1 * | 2/2002 | Grubb et al. | 359/134 |
| 6,348,987 | B1 * | 2/2002 | Tomofuji | 359/124 |
| 6,359,729 | B1 * | 3/2002 | Amoruso | 359/177 |
| 6,366,393 | B1 * | 4/2002 | Feulner et al. | 359/337 |
| 6,366,395 | B1 * | 4/2002 | Drake et al. | 359/337 |
| 6,377,394 | B1 * | 4/2002 | Drake et al. | 359/337.4 |
| 6,388,801 | B1 * | 5/2002 | Sugaya et al. | 359/334 |

OTHER PUBLICATIONS

Jang et al. "Implementation of automatic gain controlled bidirectional EDFA in WDM networks." CLEO/Pacific Rim, 1999, pp. 650–651, vol. 3.*

Hayee et al. "Fiber transmission penalties due to EDFA power transients resulting from fiber nonlinearity and ASE noise in add/drop multiplex WDM networks." OFC/IOOC Tech. Digest 1999, pp. 307–309.*

Sun et al. "Fast power transients in WDM optical networks with cascaded EDFAs." Elect. Lett. 33:4, Feb. 1999, pp. 313–314.*

Srivastava et al. "EDFA Transient Response to Channels Loss in WDM Transmission System." IEEE Photonics Tech. Lett. 9:3 Mar. 1997.*

Suzuki et al. "Power Excusrsion Suppression in Cascades of Optical Amplifiers with Automatic Maximum Level Control." IEEE Photonics Tech. Lett. 11:8, Aug. 1999, pp. 1051–1053.*

Park et al. "Dynamic Gain and Output Power Control in a Gain–Flattened Erbium–Doped Fiber Amplifier." IEEE Photonics Tech Lett. 10:6, Jun. 1998, pp. 787–789.*

Sun et al. "Optical Fiber Amplifiers for WDM Optical Networks" Bell Labs Journal, pp. 187–206, Jan.–Mar., 1999.

Nortel Networks Datasheet "MGM Multiwavelength Gain Module" (Nov. 3, 2000).

Ono et al. "Automatic Gain Control in Silica–Based EDFA with over 50nm Flat Gain Bandwidth using an all Optical Feedback Loop" $10^{th}$ Optical Amplifiers and their Applications Technical Digest, Jun. 9–11, 1999.

Kakui et al. "Dynamic–Gain–Tilt–Free Long–Wavelength Band Erbium Doped Fiber Amplifiers Utilizing Temperature Dependent Characeristics of Gain Spectrum" $25^{th}$ Optical Fiber Communication Conference, Technical Digest, pp. 6–8, (Mar. 8, 2000).

Dalavaque et al. "Gain Control in Erubium–Doped Fibre Amplifiers by Lasing at 1480nm With Photoinduced Bragg Gratings Written on Fibre Ends" Electronics Letters, vol. 29, No. 12, pp. 1112–1114, June. 10, 1993.

Massicott et al. "1480nm Pumped Erbium Doped Fibre Amplifier with all Optical Automatic Gain" Electronics Letters, vol. 30, No. 12 pp. 962–964, Jun. 9, 1994.

Motoshima et al. "EDFA with Dynamic Gain Compensation for Multiwavelength Transmission Systems" OFC '94 Technical Digest, pp. 191–192.

Zirngibl et al. "Gain Control in Erbium–Doped Fibre Amplifiers by an All Optical Feedback Loop" Electronics Letters, vol. 27. No.7, pp. 560–561, Mar. 28, 1991.

* cited by examiner

OPTICAL AMPLIFIER SYSTEMS WITH TRANSIENT CONTROL

This application claims the benefit of provisional patent application No. 60/254,577, filed Dec. 12, 2000.

BACKGROUND OF THE INVENTION

The present invention relates to fiber-optic communications networks, and more particularly, to optical amplifier arrangements with transient control capabilities for use in optical communications networks.

Fiber-optic networks are used to support voice and data communications. In optical networks that use wavelength division multiplexing, multiple wavelengths of light are used to support multiple communications channels on a single fiber.

Optical amplifiers are used in fiber-optic networks to amplify optical signals. For example, optical amplifiers may be used to amplify optical data signals that have been subject to attenuation over fiber-optic links. A typical amplifier may include erbium-doped fiber coils that are pumped with diode lasers. Raman amplifiers have also been investigated. Discrete Raman amplifiers may use coils of dispersion-compensating fiber to provide Raman gain. Distributed Raman amplifiers provide gain in the transmission fiber spans that are used to carry optical data signals between network nodes.

Sometimes channels in a communications link may be abruptly added or dropped due to a network reconfiguration. Channels may sometimes be dropped due to accidental fiber cuts. When the number of channels carried by a link changes abruptly, the total signal power being transported over the link changes suddenly. This can adversely affect the performance of distributed or discrete amplifier equipment in the link.

For example, if a distributed Raman amplifier is pumped at a constant power, these sudden changes in signal power will result in transient effects in the gain of the distributed Raman amplifier. Gain transients in a distributed Raman amplifier may cause fluctuations in the power of the output signals at the end of a fiber span. Output signals that are too weak may be difficult to detect without errors. Output signals that are too strong may give rise to nonlinear optical effects.

Abrupt changes in the signal power on the link may also cause undesirable transient effects in the gain of a discrete Raman amplifier or an erbium-doped fiber amplifier.

It is an object of the present invention to provide optical amplifier arrangements for fiber-optic communications system with transient control capabilities.

It is also an object of the present invention to provide optical amplifier arrangements in which gain transients are controlled using information on the optical power of a particular channel or channels in an optical communications link.

SUMMARY OF THE INVENTION

These and other objects of the invention are accomplished in accordance with the present invention by providing optical amplifier arrangements for wavelength-division-multiplexing optical communications links that support multiple channels operating at different wavelengths. Optical amplifier equipment may be used to amplify optical signals on a given communications link. The optical amplifier equipment may be based on distributed or discrete Raman amplifiers, rare-earth-doped fiber amplifiers such as erbium-doped fiber amplifiers, or any other suitable amplifiers.

The optical signals on the link may be monitored using optical monitoring equipment. The optical monitoring equipment may include one or more filters for filtering out the optical signals corresponding to a particular channel or channels from the other optical signals. The optical power for this particular channel or channels may be maintained at a constant level by controlling the optical amplifier equipment. For example, the optical power for the particular channel or channels may be maintained at a constant level by adjusting the pump power in the amplifier equipment to maintain the gain of the optical amplifier at a constant level. The channel or channels that are monitored may be channels that the network provider ensures will always be present during normal operation of the network. Controlling the amplifier equipment in this way suppresses gain transients for the other channels, even when some of those other channels are added or dropped abruptly.

Further features of the invention and its nature and various advantages will be more apparent from the accompanying drawings and the following detailed description of the preferred embodiments.

DETAILED DESCRIPTION OF THE PREFERRED EMBODIMENTS

Figure 1:
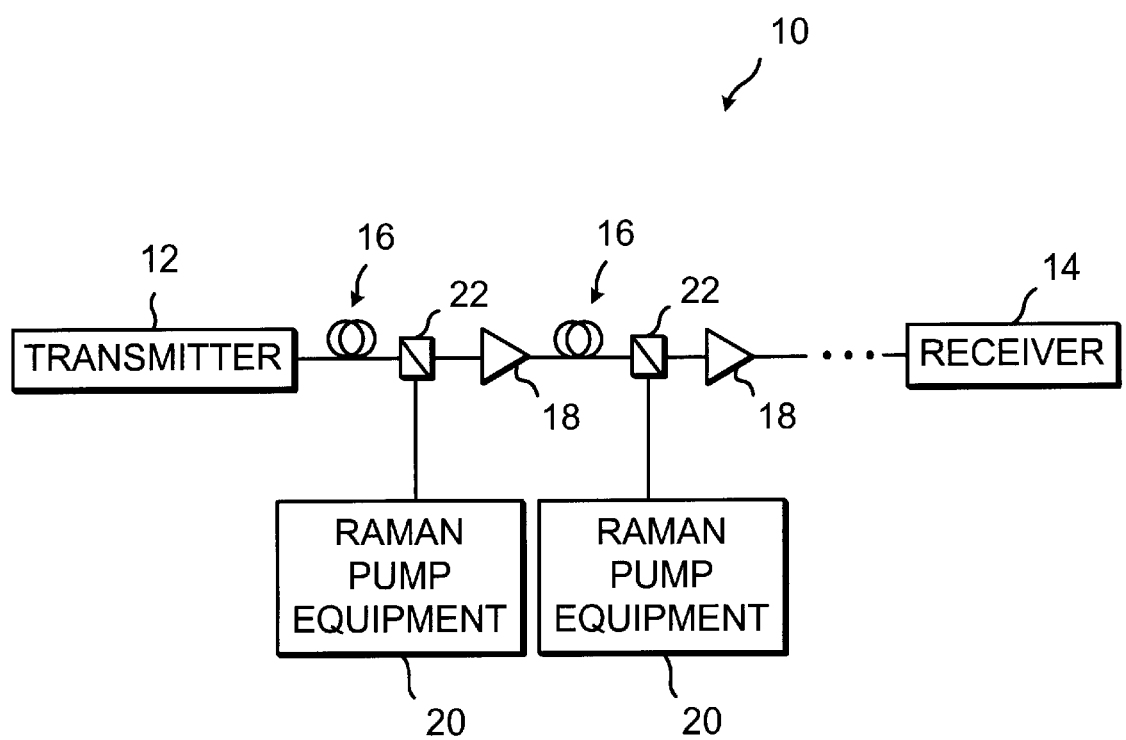
FIG. 1 is a schematic diagram of an illustrative fiber-optic communications link including Raman amplifier equipment in accordance with the present invention.

An illustrative optical communications network link 10 with distributed Raman gain in an optical communications network in accordance with the present invention is shown in FIG. 1. A transmitter 12 may transmit information to a receiver 14 over a series of fiber links. Each fiber link may include a span 16 of optical transmission fiber. Fiber spans may be on the order of 40–160 km in length for long-haul networks or may be any other suitable length for use in signal transmission in an optical communications network.

The communications link of FIG. 1 may be used to support wavelength division multiplexing arrangements in which multiple communications channels are provided using multiple wavelengths of light. For example, the link of FIG. 1 may support a system with 40 channels, each using a different optical carrier wavelength. Optical channels may be modulated at, for example, approximately 10 Gbps (OC-192). The carrier wavelengths that are used may be in the vicinity of 1520–1565 nm. These are merely illustrative system characteristics. If desired, a single channel may be provided or more channels may be provided (e.g., hundreds of channels), signals may be modulated at slower or faster data rates (e.g., at approximately 2.5 Gbps for OC-48 or at approximately 40 Gbps for OC-768), and different carrier wavelengths may be supported (e.g., wavelengths in the range of 1240–1650 nm).

Optical amplifiers 18 may be used to amplify optical signals between successive spans of fiber 16. Optical amplifiers 18 may be based on erbium-doped amplifier stages or other rare-earth-doped fiber amplifier stages, may be based on semiconductor optical amplifier stages, may be based on discrete Raman amplifier stages, may be based on other suitable amplifier stages, or may be based on combinations of such stages.

Raman pump equipment 20 may be used to supply Raman pump light to spans 16. Pump light may be coupled into spans 16 in the backwards direction using pump couplers 22. Pump couplers 22 may be wavelength-division multiplexing (WDM) couplers or any other suitable pump couplers. If desired, a pump coupling arrangement based on circulators may be used.

Raman pump equipment 20 may include one or more Raman pump sources (pumps) such as lasers or other optical sources operating at one or more wavelengths. For example, Raman pump equipment 20 may include diode lasers operating at one or more wavelengths. A single wavelength may be used when complexity and cost are important. Multiple pump wavelengths may be used when a wide gain spectrum is desired. In equipment with multiple pump wavelengths, any suitable number of pump wavelengths may be used. For example, two, three, four, five, . . . ten, or more pump wavelengths may be used.

Raman pump equipment 20 may include control circuitry for controlling the pump power of the various pump sources. The pump power may be adjusted based on the monitored signal power on a particular channel or channels on link 10. The particular channel or channels that are monitored form a subset of the total number of channels supported by link 10. As an example, the subset may include one or a few channels out of 40 or 160 total channels that are used when link 10 is operating at full capacity.

Any suitable feedback control technique may be used to control the Raman pump power based on the monitored signal power of the channel subset. The Raman pump power may also be adjusted based on the total monitored signal power (i.e., the signal power for all channels that are in operation on link 10). Any suitable feed-forward control technique may be used to control the Raman pump power based on the total monitored signal power.

Figure 2:
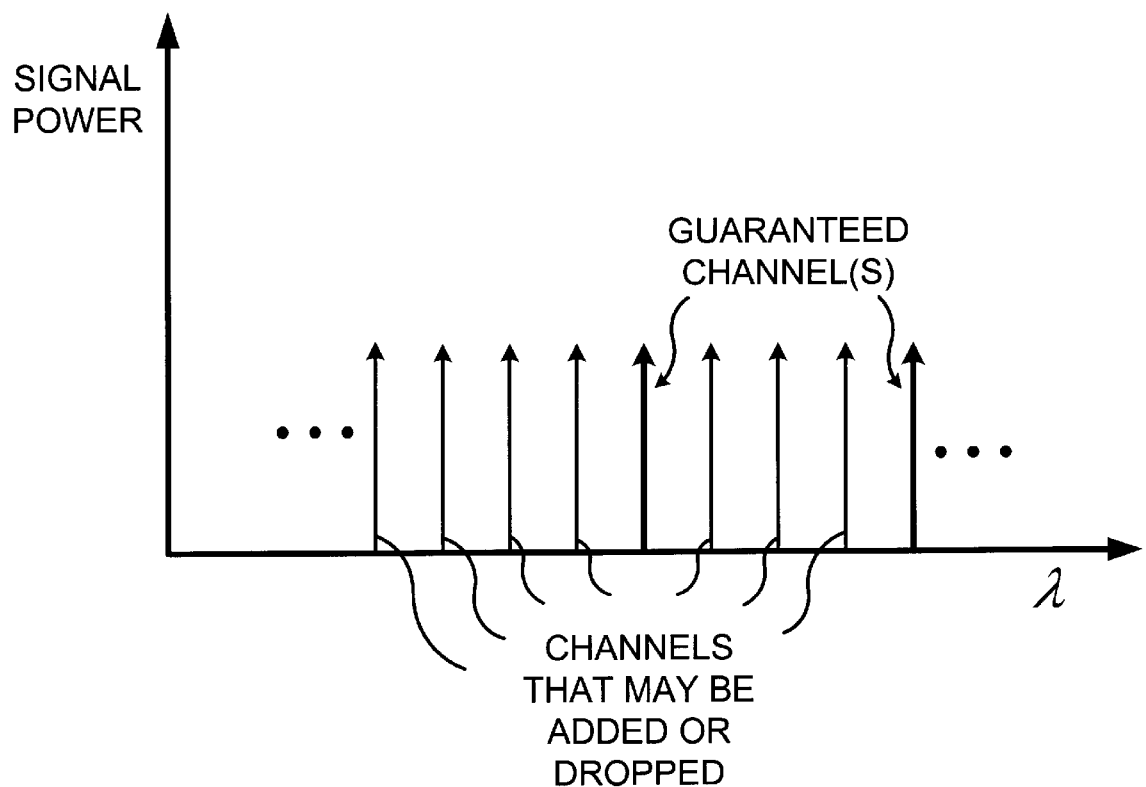
FIG. 2 is a graph showing the channels of a wavelength-division-multiplexing communications link in accordance with the present invention.

A graph illustrating the wavelength-division-multiplexing (WDM) channels that are typically carried in link 10 is shown in FIG. 2. Link 10 may not always be used at full capacity (i.e., with all channels being used). For example, when link 10 is installed in the network, link 10 may initially use only a single channel or a small number of channels. As the need for additional capacity on link 10 increases, channels at different wavelengths may be added. The network maintainer or system designer may specify which channel or channels are used first. The network maintainer or system designer may also specify that the same channel or channels are always to be dropped last. The channel or channels that are added first and dropped last will always be present in a properly operating system, even when the system is operating at its minimum capacity. Any channel or channels that the network maintainer or network designer ensures will always be present in a link may be referred to as "guaranteed" or "always present." The guaranteed or always present channel or channels may be normal data channels that are used to carry communications traffic over link 10. The signals on such a channel or channels (i.e., the "guaranteed signals" or "always present signals") will be present whether the link is operating at its minimum capacity, its maximum capacity, or an intermediate capacity between the minimum and maximum capacities.

The gain experienced by the guaranteed signals is generally representative or proportional to the gain experienced by the signals on the other channels on link 10. Accordingly, the level of the distributed Raman gain in a given span of fiber 16 may be controlled by monitoring how much the guaranteed signals are amplified on the link. If it is determined that the guaranteed signals at a given network node have been amplified too much (because the distributed Raman gain on the preceding span 16 is too large), the Raman pump power for the preceding span 16 may be lowered. If it is determined that the guaranteed signals at a given network node have not been amplified enough (because the distributed Raman gain on the preceding span 16 is too small), the Raman pump power for the preceding span 16 may be increased.

With this type of feedback arrangement, the Raman gain for all data signals in link 10 may be controlled by monitoring only the Raman gain for the guaranteed data signals. If channels (other than the guaranteed channel or channels) are added or dropped, the Raman gain can be maintained at a desired level for all data signals in link 10 by using feedback to ensure that the gain for the guaranteed data signals is held constant. The guaranteed channel or channels may be located at or near the center (e.g., at or within 5, 10, or 20 or other suitable number of channels from the center) of the data signal band (e.g., a 40, 80, or 160 channel band) that is covered by the distributed Raman amplifier, may be located at or near the edges of the data signal band, may be outside of the normal data signal band while still being at a wavelength or wavelengths that experience Raman gain (e.g., at one or more telemetry channel wavelengths), or may be located at any other suitable wavelength or wavelengths.

Figure 3:
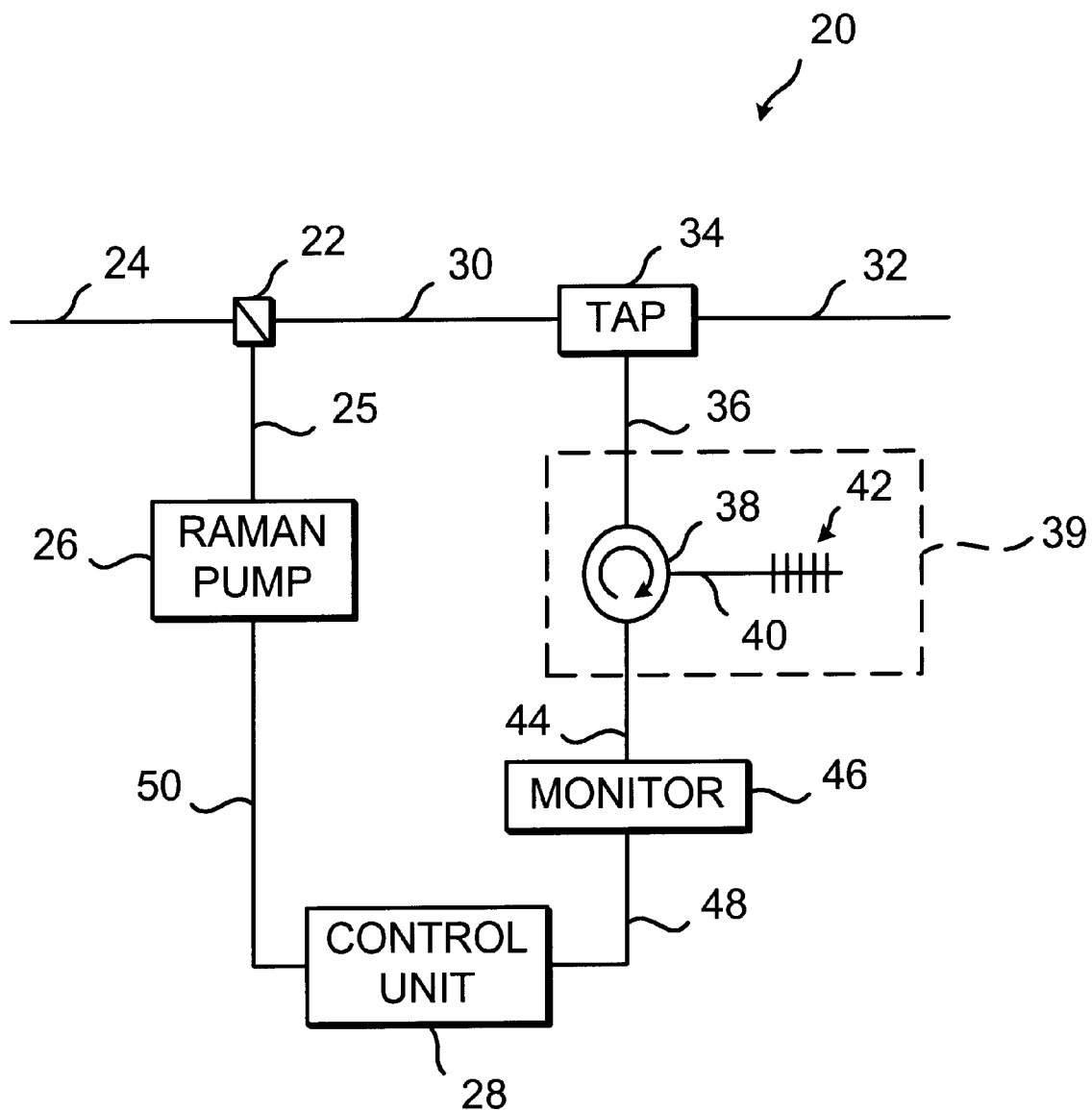
FIG. 3 is a schematic diagram of illustrative distributed Raman amplifier equipment in accordance with the present invention.

Illustrative distributed Raman pump equipment 20 that may be used in links such as link 10 is shown in FIG. 3. Pump equipment 20 such as the pump equipment of FIG. 3 may be used as the stand-alone pump portion of a distributed Raman amplifier or may be used to provide distributed Raman pump light from within one of amplifiers 18 or other suitable network equipment.

Optical signals from a preceding span of optical fiber 16 may be provided at fiber input 24. Raman pump light from Raman pump 26 may be directed into the preceding span using fiber 25 and pump coupler 22. Raman pump 26 may be any suitable source of Raman pump light such as one or more diode lasers operating at one or more wavelengths. Pump 26 may be controlled by control unit 28. Control unit 28 may be based on any suitable control electronics and may include one or more microprocessors, microcontrollers, digital signal processors, programmable logic devices, application-specific integrated circuits, digital-to-analog converters, memory devices, etc.

The optical signals provided to fiber input 24 pass through pump coupler 22 to fiber 30. All channels carried on link 10 are present on fiber 30. A signal monitoring arrangement may be used to monitor the power of the guaranteed signals. The guaranteed signals may be monitored while all signals on the link (i.e., the guaranteed signals and the other signals on the link) are passed to fiber output 32. Fiber output 32 may be connected to the input of an amplifier 18 or other suitable equipment or fiber in link 10.

Any suitable optical components and electrical circuitry may be used to monitor the power of the guaranteed signals without blocking any signals (i.e., without blocking the guaranteed signals or any of the other signals on the link). The monitoring arrangement shown in the example of FIG. 3 includes a tap 34 (e.g., a wavelength-insensitive 2%/98% tap) that provides tapped light to fiber 36. Circulator 38 may be used to direct the tapped light from fiber 36 to fiber 40. Filter 42 may be used to filter the guaranteed signals from the other tapped signals. Filter 42 may be a fiber-Bragg-grating filter, a dielectric filter, or any other suitable optical filter. If the guaranteed signals correspond to a particular guaranteed signal channel at a particular wavelength, a filter 42 may be used that is configured to reflect the signals at that wavelength back along fiber 40 to circulator 38. If the guaranteed signals correspond to a particular band of channels, a filter 42 may be used that is configured to reflect the signals for the group of channels in that band back along fiber 40.

If desired, optical monitoring components such as circulator 38 and filter 42 (and circulator 52 and filter 54) may be provided in the same package (e.g., as an integrated filter), as shown by dotted line 39. Moreover, taps such as tap 34 may be placed before pump coupler 22 or at any other suitable location.

Regardless of the particular type of filter that is used, the filter 42 is preferably configured so that the signals reflected from filter 42 are only the guaranteed (always present) signals (i.e., the signals for the guaranteed or always present channel or channels). The tapped light for the other optical signals passes through filter 42 and may be disregarded.

The reflected signals from filter 42 (i.e., the tapped guaranteed signals) enter circulator 38 from fiber 40 and are directed to fiber 44. Monitor 46 may be used to measure the power of the tapped guaranteed signals. Monitor 46 may include any suitable monitoring circuitry. For example, monitor 46 may include a photodetector, a transimpedance amplifier, and an analog-to-digital converter. Information on the measured power of the guaranteed signals may be passed to control unit 28 over electrical path 48.

Control unit 28 may process the information on the measured guaranteed signal power and may control Raman pump 26 accordingly using electrical path 50. For example, control unit 28 may adjust the pump current of one or more laser diodes in Raman pump 26. Control unit 28 may make such pump adjustments continually, so that the measured power for the guaranteed signals remains constant. This ensures that the Raman gain in the span of fiber 16 that is pumped by pump 26 remains fixed at a constant level (i.e., gain transients in the distributed Raman amplifier are suppressed).

Any suitable feedback control technique may be used to adjust the Raman pump power of pump 26 based on the power of the measured guaranteed signals. The feedback control technique may be used to maintain the power of the measured guaranteed signals or the gain experienced by the guaranteed signals at a desired level. The setting for the desired gain or power level of the measured guaranteed signals may be set by the network maintainer during operation of the network.

The network maintainer may control settings in the network using a network control and management system. The network control and management system may use network control and management software that is implemented on network computer equipment at network nodes and other network facilities.

The network maintainer may use the network control and management system to provide information on the desired gain or power level of the measured guaranteed signals to Raman pump equipment 20 over a telemetry channel path, a wireless communications path, a communications path using small low-frequency signal modulations on top of some or all of the normal data channels in link 10, or any other suitable communications path.

Raman pump equipment 20 may use feedback to maintain the power level of the measured guaranteed signals $P_{GUARANTEED-MEASURED}$ at a given desired level $P_{GUARANTEED-DESIRED}$. The value of $P_{GUARANTEED-DESIRED}$ may be adjusted up or down by the network maintainer or may be set to a particular value by passing suitable commands from the network control and management system to the pump equipment over a suitable communications path.

To calculate the gain setting for the Raman gain in a given span 16, information on the power of the guaranteed signals at the input to that span 16 ($P_{GUARANTEED-IN}$) (i.e., the power of the guaranteed signals at the output of the preceding node in link 10) may be provided to the appropriate Raman pump equipment 20 using the network control and management system. The Raman pump equipment 20 may then calculate the measured Raman gain $G_{MEASURED}$ in span 16 using equation 1.

$$G_{MEASURED} = P_{GUARANTEED-MEASURED}/P_{GUARANTEED-IN} \quad (1)$$

The value of $P_{GUARANTEED-MEASURED}$ may be measured using the optical monitoring arrangement of FIG. 3.

Raman pump equipment 20 may use feedback to maintain the gain level $G_{MEASURED}$ at a desired level $G_{DESIRED}$. The value of $G_{DESIRED}$ may be adjusted up or down by the network maintainer or may be set to a particular value by passing suitable commands from the network control and management system to Raman pump equipment 20 over a suitable communications path.

Regardless of whether pump equipment 20 is directed to maintain the gain of the span at a desired level or is directed to maintain the power level of the guaranteed signals at a desired level, gain transients and power fluctuations on the data channels are suppressed by the real time Raman pump adjustments made by equipment 20. Both of these illustrative techniques suppress transients by using feedback based on the measured values of the guaranteed signals.

Any suitable feedback control technique may be used by Raman pump equipment 20 to maintain the Raman gain produced by equipment 20 or the power level of the guaranteed signals at a desired level. For example, the proportional-integral-derivative (PID) method may be used. With this approach, an error parameter E may be calculated using equation 2 (when feedback is based on a desired gain value) or equation 3 (when feedback is based on a desired power value for the guaranteed signals).

$$E = G_{MEASURED} - G_{DESIRED} \quad (2)$$

$$E = P_{GUARANTEED\text{-}MEASURED} - P_{GUARANTEED\text{-}DESIRED} \quad (3)$$

Control unit 28 of equipment 20 may then use equation 4 to determine the appropriate pump power $P_{PUMP\text{-}FB}$ for pump 26.

$$P_{PUMP\text{-}FB} = \alpha E + \beta \int E + \gamma E' \quad (4)$$

In equation 5, $\alpha$, $\beta$, and $\gamma$ are fitting parameters that may be determined experimentally.

Figure 4:
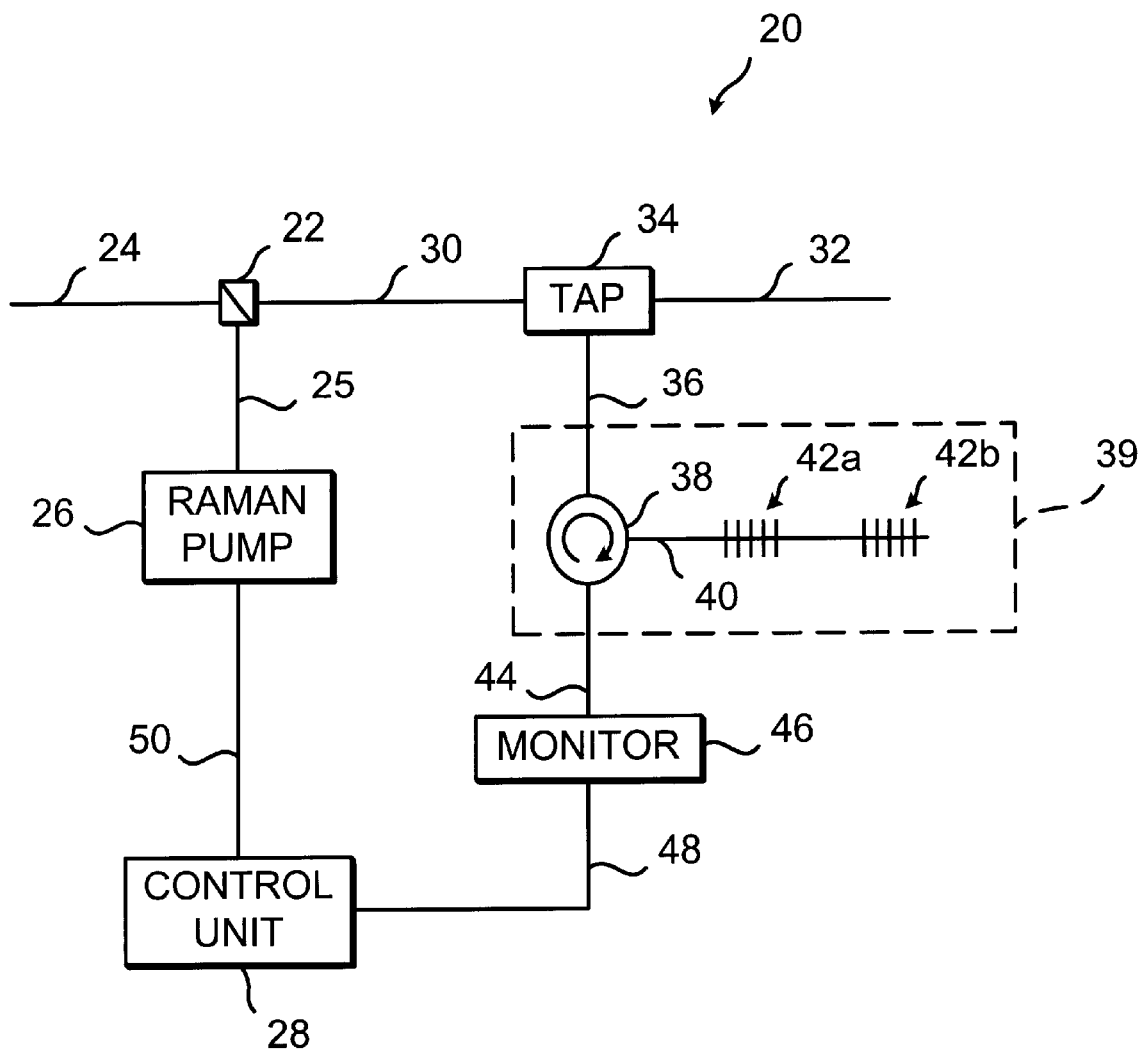
FIG. 4 is a schematic diagram of additional illustrative distributed Raman amplifier equipment in accordance with the present invention.

The optical monitoring arrangement shown in FIG. 3 is merely one illustrative arrangement that may be used to measure the power of the guaranteed signals ($P_{GUARANTEED\text{-}MEASURED}$). Another suitable arrangement is shown in FIG. 4. In the FIG. 4 configuration, tap 34 taps the optical signals traveling on the fiber path between input 24 and output 32. The tapped signals are directed over fiber 40 to two filters 42a and 42b by circulator 38. Filter 42a may be configured to reflect light at a first wavelength or wavelength band. The signals that are not reflected are passed to filter 42b. Filter 42b may be configured to reflect light at a second wavelength or wavelength band. The wavelength bands reflected by filters 42a and 42b may each cover more than one channel if desired.

Reflected light at the guaranteed signal wavelengths that is directed towards circulator 38 along fiber path 40 is directed to path 44 by circulator 38. Monitor 46 may be used to measure the power of these signals.

Figure 5:
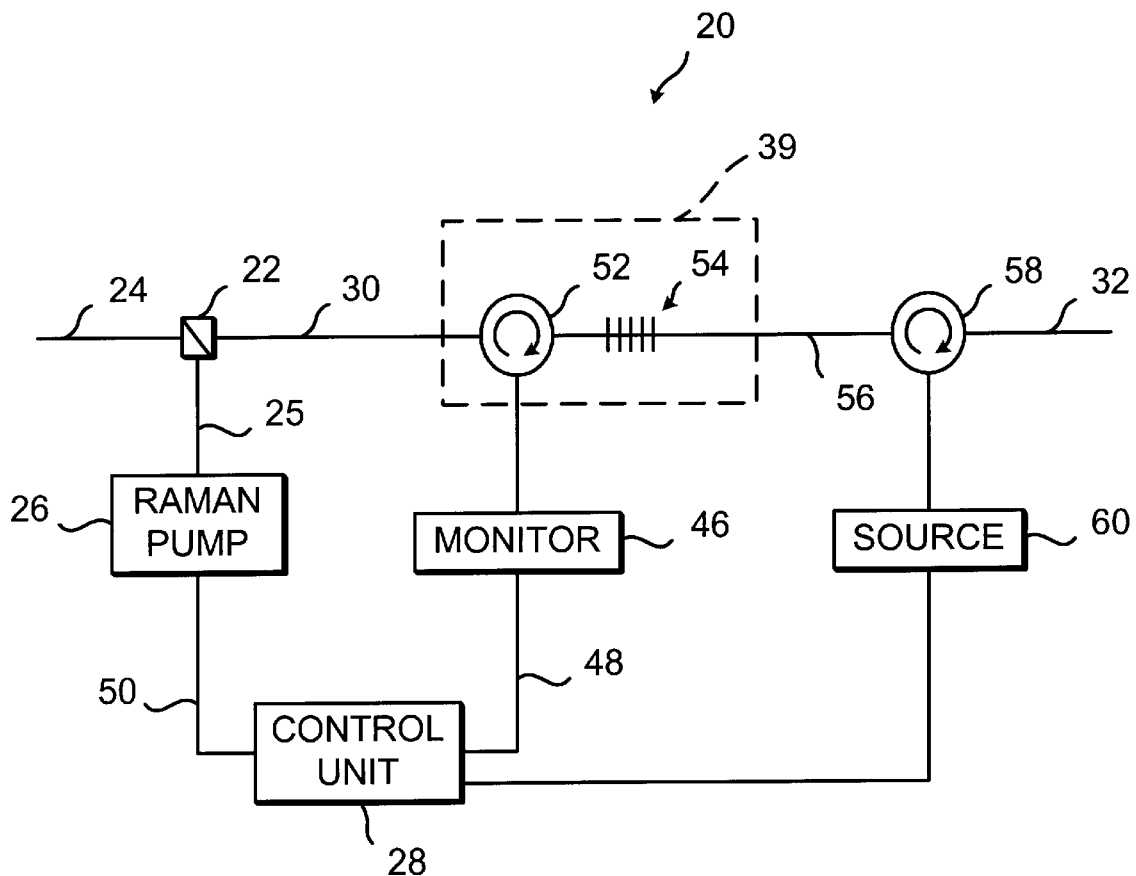
FIG. 5 is a schematic diagram of illustrative distributed Raman amplifier equipment using a circulator-based tap as part of the optical monitoring equipment in accordance with the present invention.

Another illustrative optical signal monitoring arrangement that may be used to measure the power of the guaranteed signals traveling in the fiber path between input 24 and output 32 is shown in FIG. 5. With the arrangement of FIG. 5, optical signals from input 24 pass through circulator 52 to filter 54. The guaranteed signals (from one or more guaranteed channels) are reflected back into circulator 52 by filter 54. The remainder of the signals pass through filter 54 to fiber 56. These signals pass through circulator 58 to output fiber 32.

The reflected guaranteed signals may be monitored using monitor 46. For example, the power of the reflected guaranteed signals may be monitored. A new version of the guaranteed signals may be added to the fiber path using source 60. The added signals may be passed to output 32 by circulator 58. The added signals may be modulated so that the added signals contain the same information that were contained in the signals measured by monitor 46. The guaranteed signals in the FIG. 5 arrangement need not be used to carry normal data over link 16. The guaranteed signals may be unmodulated (i.e., these signals may be constant), they may be modulated with a pattern that does not convey data, or they may be modulated at relatively low data rates if desired. The guaranteed channel or channels that are used in the FIG. 5 example may be one or more telemetry channels.

Figure 6:
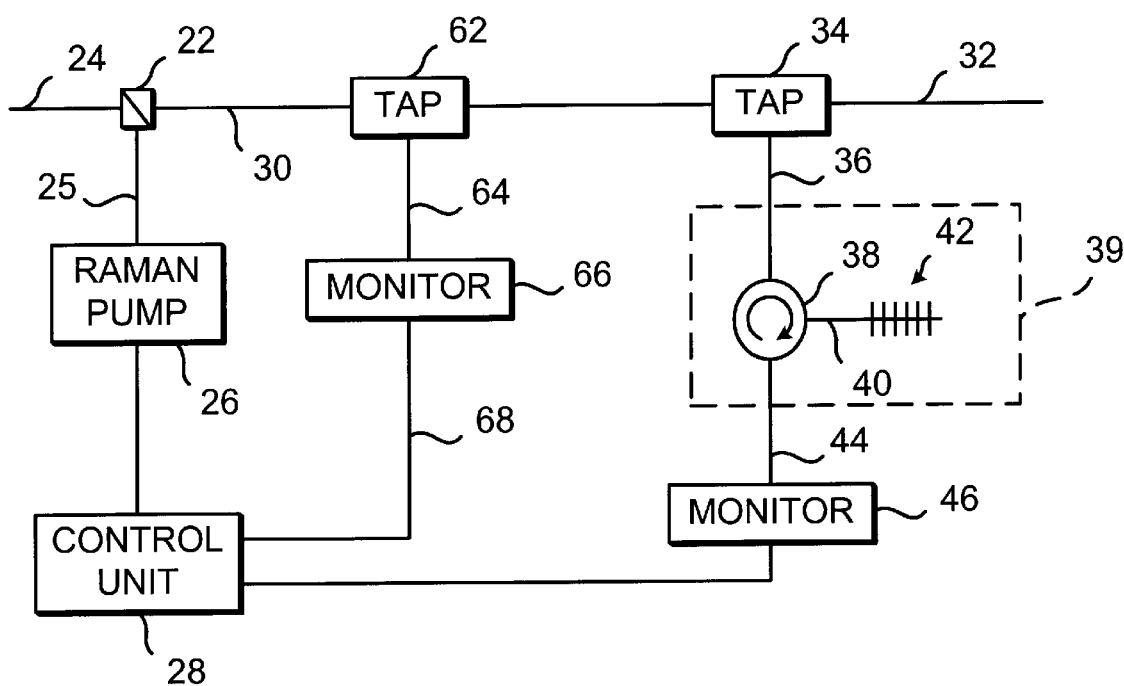
FIG. 6 is a schematic diagram of illustrative distributed Raman amplifier equipment in which the total optical signal power of all channels and the optical signal power of a particular channel or channels may be monitored in accordance with the present invention.

Pump equipment 20 may have an optical signal monitoring arrangement that allows the total signal power to be measured. An illustrative configuration of this type is shown in FIG. 6. As shown in FIG. 6, pump equipment 20 may have optical components and circuitry that allow the total input power of the optical signals provided to input fiber 25 to be monitored by control unit 28.

Optical signals at input 24 pass through pump coupler 22 to fiber 30. Tap 62 (e.g., a wavelength-insensitive 2%/98% tap) may be used to tap a portion of the optical signals traveling along the fiber path between input 24 and fiber output 32. The tapped signals may be provided to monitor 66 over fiber 64. Monitor 66 may be any suitable monitoring circuitry. For example, monitor 66 may include a photodetector, a transimpedance amplifier, and an analog-to-digital converter. Information on the total signal power of all channels being handled by equipment 20 may be provided to control unit 28 from monitor 66 using electrical path 68.

Information on the power of the guaranteed signals may be gathered using any suitable arrangement such as any of the arrangements of FIGS. 3–5. In the example of FIG. 6, signals at the guaranteed channel wavelength or wavelengths may be collected using tap 34, circulator 38, filter 42, and monitor 46.

Figure 7:
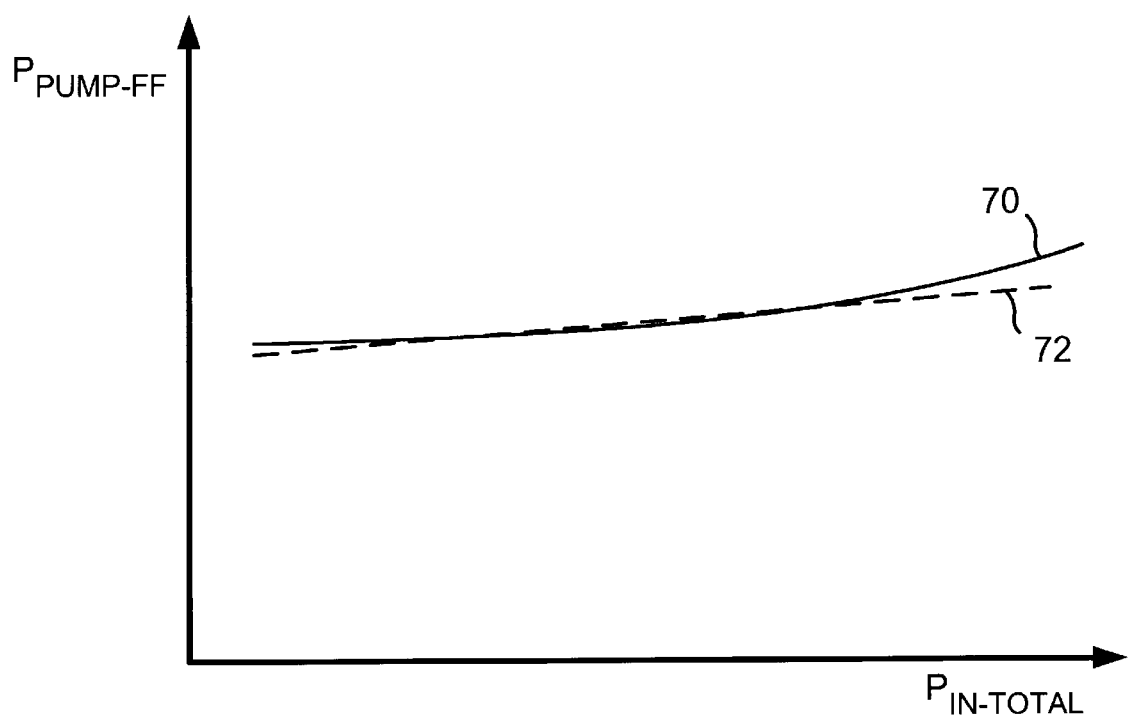
FIG. 7 is a graph showing how Raman pump power may be adjusted based on measured total input power in accordance with the present invention.

Control unit 28 may adjust the pump power $P_{PUMP\text{-}FF}$ that is provided by Raman pump 26 to fiber 16 based on the measured total input power using a feed-forward control technique. An illustrative relationship that may be used to determine the appropriate feed-forward pump power $P_{PUMP\text{-}FF}$ as a function of the total input power measured using monitor 66 is given by the solid line 70 of FIG. 7. To ease the demands placed on control unit 28, line 70 may be approximated using linear functional form, as given by equation 5 and as shown by dotted line 72 in FIG. 7.

$$P_{PUMP\text{-}FF} = a\, P_{IN\text{-}TOTAL} + b \quad (5)$$

The fitting constants "a" and "b" in equation 5 may be determined experimentally.

The functional form of equation 5 is merely one suitable functional form that may be used to express feedforward pump power as a function of total input power. Other functional forms may be used if desired. For example, a second-order or higher-order functional form may be used. Such functional forms may be stored in the control unit using a look-up table or using any other suitable approach. By controlling the pump power of pump 26 according to equation 5, gain transients due to sudden changes in input power may be suppressed.

Control unit 28 of FIG. 6 may control the power produced by pump 26 based on information on the total input power from monitor 66 and based on information on the guaranteed signal power from monitor 46. For example, a pump power $P_{PUMP}$ for pump 26 may be calculated by combining a feed-forward pump contribution $P_{PUMP\text{-}FF}$ and a feedback pump contribution $P_{PUMP\text{-}FB}$ using equation 6.

$$P_{PUMP} = P_{PUMP\text{-}FF} + P_{PUMP\text{-}FB} \quad (6)$$

In equation 6, $P_{PUMP\text{-}FF}$ may be determined using equation 5 and $P_{PUMP\text{-}FB}$ may be determined using equation 4. Equation 6 is merely one illustrative example of a hybrid control technique that may be used to control the power of Raman pump 26 using a combination of feed-forward and feedback control techniques. Any other suitable combining function may be used and the feed-forward and feedback contributions may be determined using any suitable techniques.

When control unit 28 of FIG. 6 uses a hybrid control approach such as the approach of equation 6 to calculate the pump power to be provided by pump 26, the feed-forward contribution to the pump reflects rapid pump power adjustments to be made based on sudden changes in the total input power (e.g., due to added or dropped channels). The feedback contribution reflects corrections to be made for inaccuracies in the feed-forward contribution and corrections for longer term effects (e.g., effects due to fiber and component aging and other drift effects). If desired, control unit 28 may be configured to make changes to the feed-forward contribution only if the calculated feed-forward contribution changes more rapidly than a predetermined threshold amount. With this type of approach, control unit 28 may be used to form a high-pass filter for preprocessing the total input power measurements before these measurements are used in equation 5. This approach may help to reduce unnecessary up-and-down power changes in pump 26.

Figure 8:
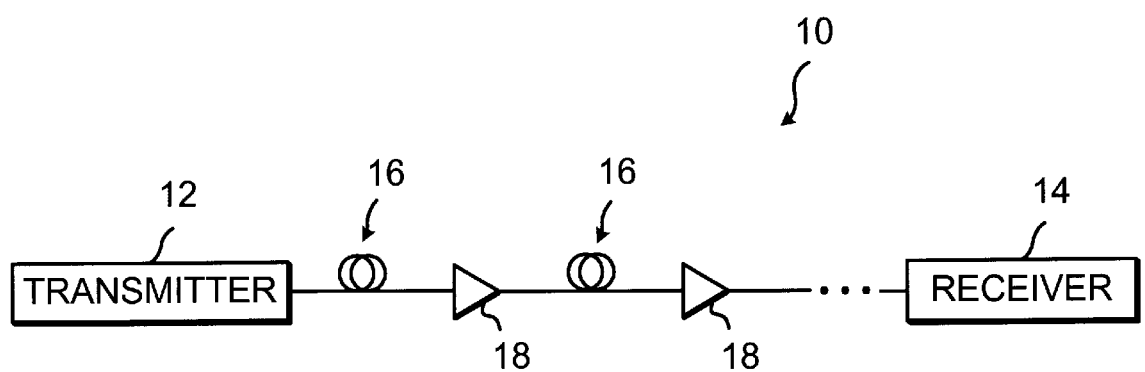
FIG. 8 is a schematic diagram of an illustrative fiber-optic communications link without distributed Raman equipment in accordance with the present invention.

If desired, gain transients may be controlled in amplifier arrangements based on discrete (lumped) gain stages. An illustrative communications link 10 with amplifiers based on discrete gain stages is shown in FIG. 8. Transmitter 12 may transmit information to a receiver 14 over a series of fiber links 16. Optical amplifiers 18 may be used to amplify optical signals between successive spans of fiber 16. Optical amplifiers 18 may be based on erbium-doped amplifier stages or other rare-earth-doped fiber amplifier stages, may be based on semiconductor optical amplifier stages, may be based on discrete Raman amplifier stages, may be based on other suitable stages, or may be based on combinations of such stages. If semiconductor optical amplifier stages are used, such stages may be electrically pumped rather than optically pumped.

Figure 9:
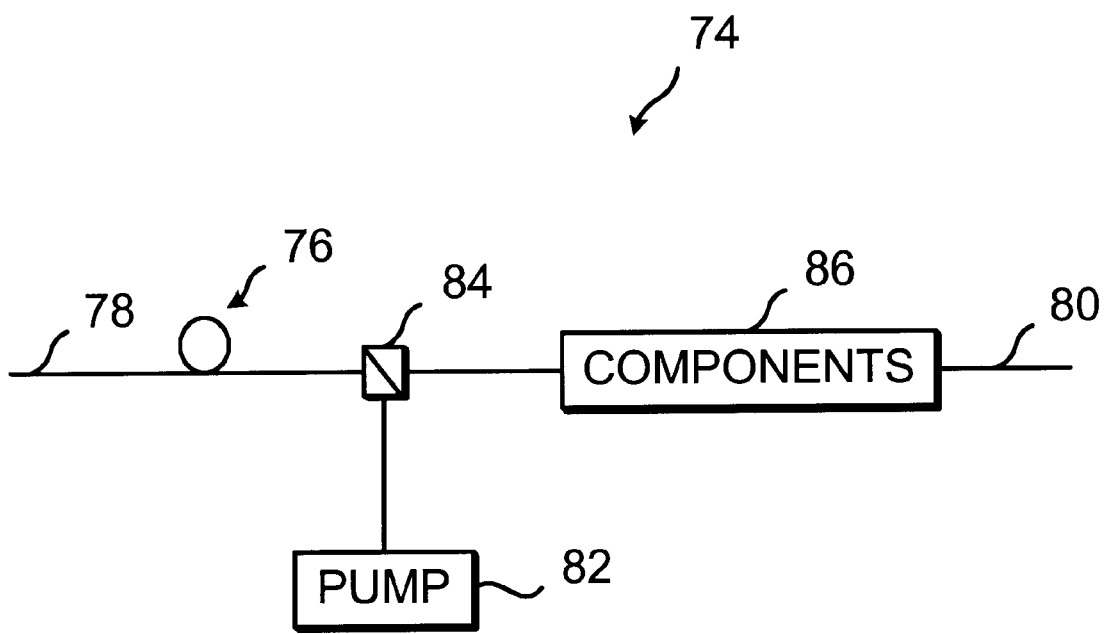
FIG. 9 is a schematic diagram of an illustrative amplifier stage in accordance with the present invention.

An illustrative gain stage of the type that may be used in amplifiers 18 is shown in FIG. 9. In the example of FIG. 9, gain for gain stage 74 is provided by fiber coil 76. Fiber 76 may be rare-earth-doped fiber such as erbium-doped fiber or may be Raman fiber (e.g., small-core fiber or dispersion-compensating fiber or other suitable fiber for producing Raman gain in a coil inside an amplifier or other network equipment). When fiber 76 is optically-pumped to produce gain, optical signals that are provided to gain stage input 78 may be amplified by coil 76. The corresponding amplified optical signals may be provided at gain stage output 80.

Gain stage 74 may have an optical pump 82 (e.g., one or more laser diodes operating at one or more suitable wavelengths) for pumping fiber 76. (Pump 82 may be an electrical pump for stages based on semiconductor optical amplifiers.) Pump light from pump 82 may be coupled into fiber 76 using pump coupler 84. Gain stage 74 may have any suitable number of additional coils or gain media and may have various optical components 86 such as taps, filters, wavelength-division-multiplexing couplers, circulators, isolators, attenuators, dispersion-compensating elements, etc. These components may be located before, after, or between the coils or other gain media in the stage.

Figure 10:
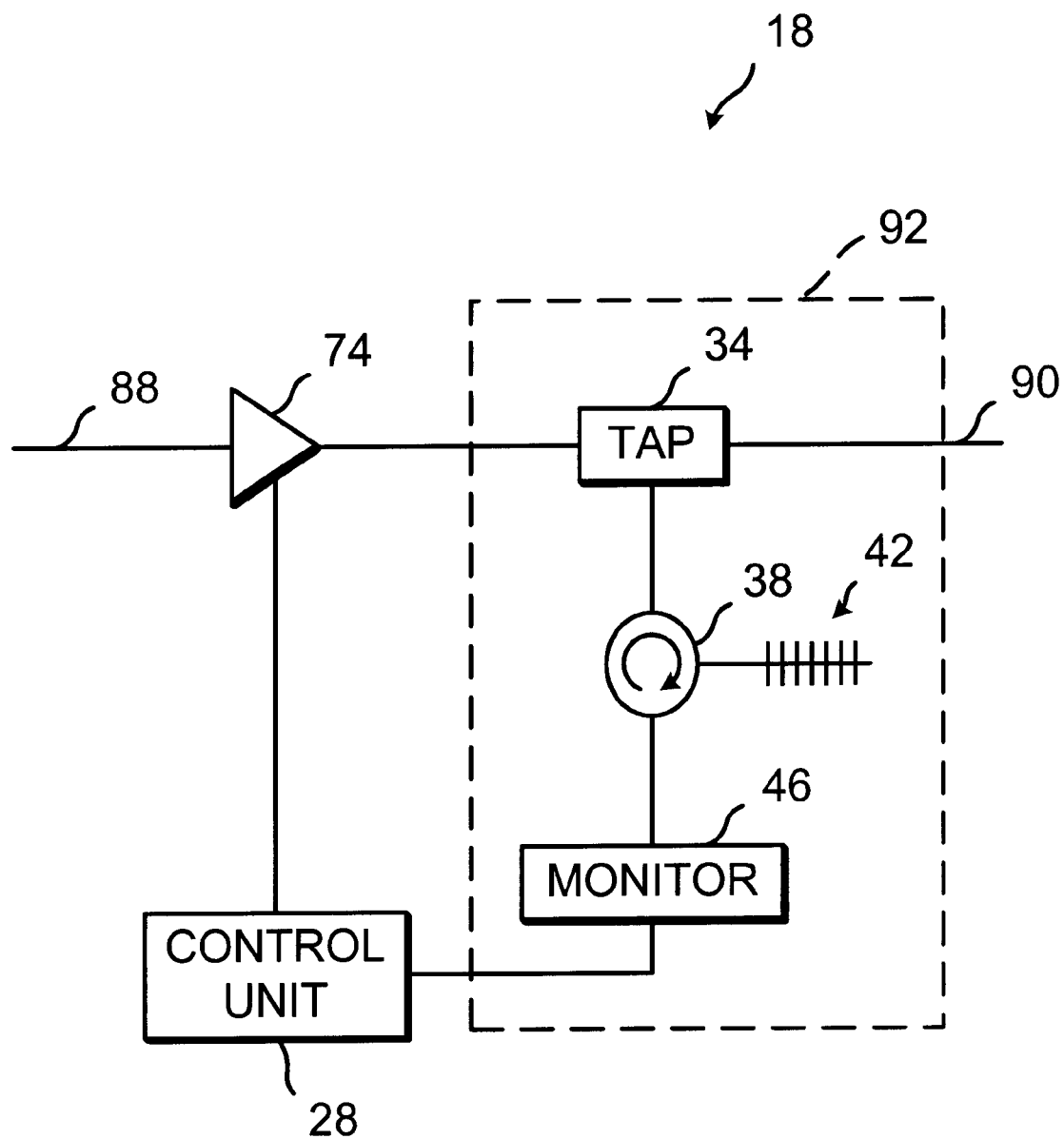
FIG. 10 is a schematic diagram of an illustrative amplifier that may be based on an amplifier stage of the type shown in FIG. 9 and that has optical monitoring equipment for monitoring a particular channel or channels in accordance with the present invention.

An illustrative amplifier 18 having a gain stage 74 is shown in FIG. 10. Amplifier 18 of FIG. 10 may be used in a link such as link 10 of FIG. 8 or a Raman-assisted transmission link that includes a distributed Raman amplifier arrangement.

Amplifier 18 amplifies optical signals received from a span of fiber 16 at input fiber 88. Optical gain may be provided by stage 74. The pump power in stage 74 (e.g., the pump power produced by one or more pumps such as pump 82 of FIG. 9) may be controlled by control unit 28 to suppress gain transients in stage 74. Optical signals on the guaranteed channel or channels (i.e., the guaranteed signals) on link 10 may be separated from the fiber path in amplifier 18 and monitored using optical components and monitoring circuitry such as optical components and monitoring circuitry 92.

The tapped guaranteed signals may be monitored using monitor 46 and processed using control unit 28. The guaranteed signals and other optical signals provided to input 88 pass through gain stage 74 and tap 34 to output fiber 90.

When control unit 28 detects a drop or increase in the power of the guaranteed signals ($P_{GUARANTEED-MEASURED}$), the control unit 28 may adjust the pump power in stage 74 using feedback, as described in connection with equations 1–4. In general, the pump power adjustments that are needed to correct for gain transients in Raman-pumped systems are smaller in magnitude than the pump power adjustments that are used in erbium-doped fiber amplifier systems. The amount of the adjustment that should be made for a given measured value of guaranteed signal power may be reflected in the fitting parameters that are used in equation 4.

Figure 11:
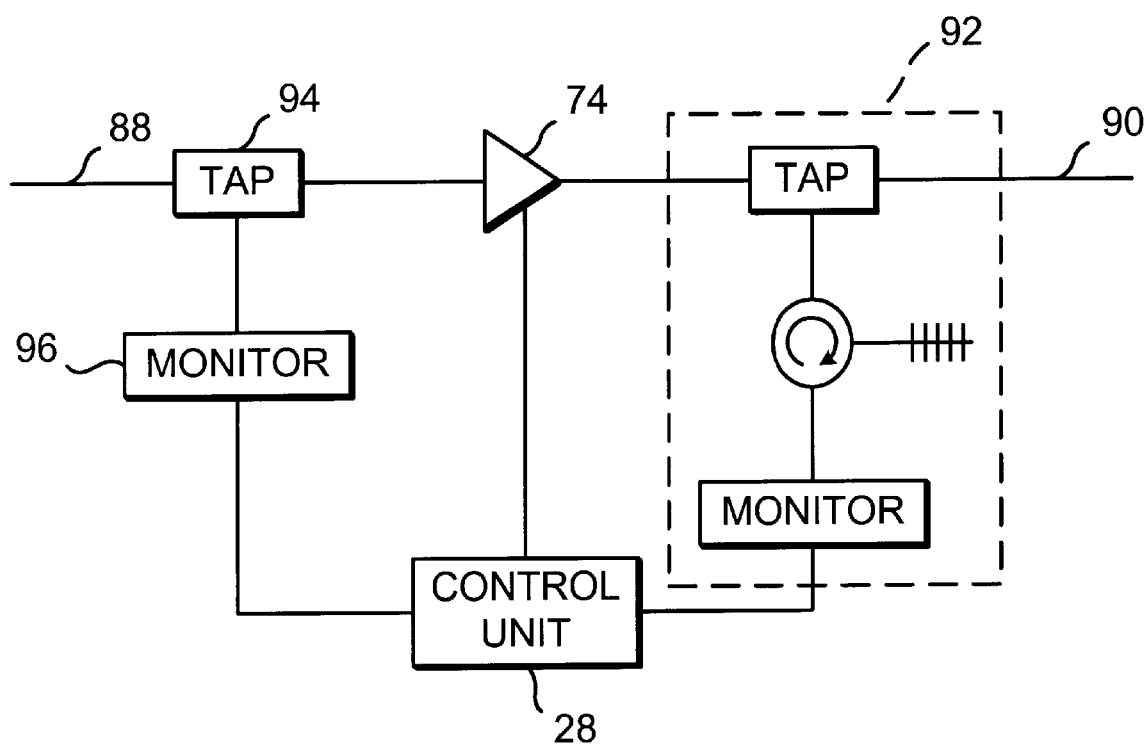
FIG. 11 is a schematic diagram of an illustrative amplifier that may be based on an amplifier stage of the type shown in FIG. 9 and that has optical monitoring equipment for monitoring the total optical signal power of all channels on a link and the optical signal power of a particular subset of one or more channels in accordance with the present invention.

Another arrangement in which gain transients may be controlled based on the measured power of the guaranteed signals is shown in FIG. 11. In the FIG. 11 arrangement, the power of the guaranteed signals may be measured using optical components and monitoring circuitry 92. The total input power $P_{IN-TOTAL}$ may be measured using tap 94 and monitor 96.

Figure 12:
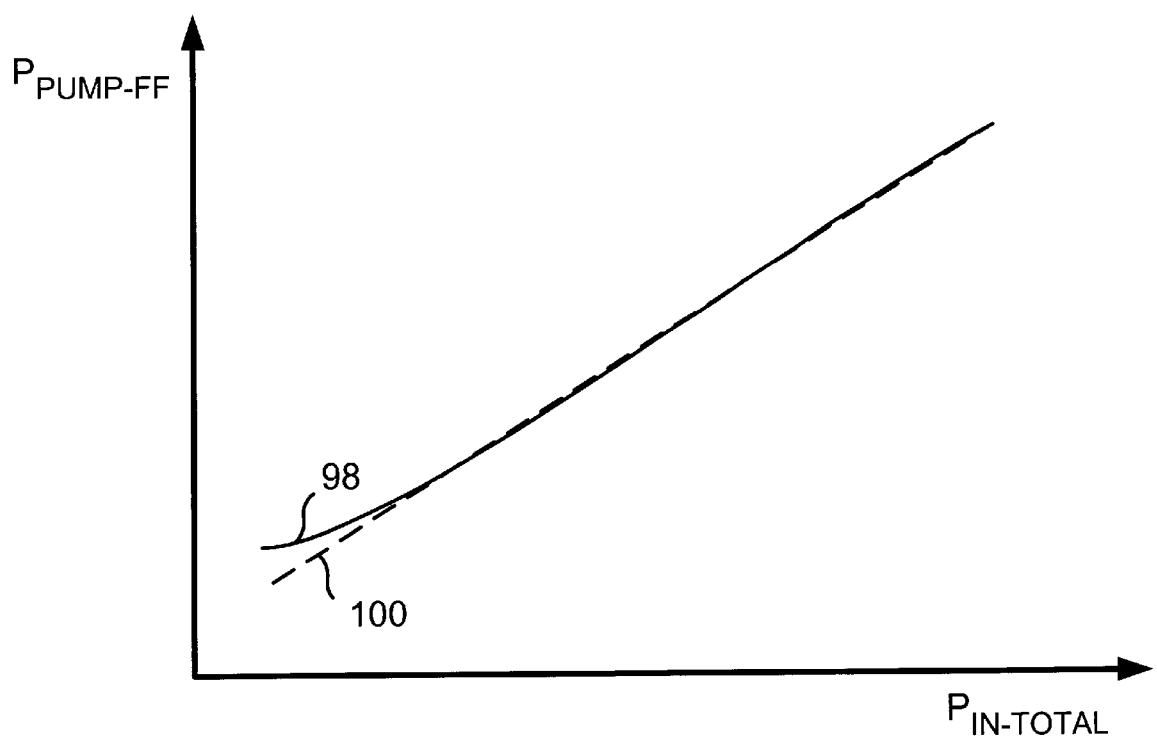
FIG. 12 is a graph showing how pump power for an erbium-doped fiber amplifier may be adjusted as a function of total input power in accordance with the present invention.

Control unit 28 may adjust the pump power for stage 74 using a feed-forward approach such as the approach set forth in equation 5. If stage 74 is based on Raman fiber, the relationship between the measured total input power and the feed-forward pump power is given by lines such as lines 70 and 72 of FIG. 7. Erbium-doped fiber amplifiers generally require larger adjustments in pump power. An illustrative relationship between the measured total input power and the feed-forward pump power that may be used for suppressing gain transients in erbium-doped fiber gain stages 74 is shown by line 98 of FIG. 12. Dotted line 100 is an illustrative linear approximation of the type set forth in equation 5 that may be used for line 98.

If desired, monitor 96 may contain a spectral filter having a transmission spectrum that matches the gain spectrum of the fiber coil or other gain medium in stage 74. Such a spectral filter may allow more accurate feed-forward adjustments to be made by control unit 28, because the filter modifies the spectrum of the measured input power signals so that the power measurements that are made reflect how signals at different wavelengths affect the loading of stage 74.

A tap and monitor arrangement such as tap 94 and monitor 96 may be used after stage 74, rather than before stage 74 as shown in FIG. 11. If the tap and monitor are placed after stage 74, a spectral filter that modifies the measured signal power so that it matches the gain spectrum of stage 74 need not be used.

Control unit 28 of FIG. 11 may use hybrid control techniques for controlling the pump power for stage 74. Such hybrid techniques may use any suitable combining function such as the combining function of equation 6 to combine feed-forward and feedback pump contributions. The feed-forward contribution may be based on the total input power measured with tap 94 and monitor 96. The feedback contribution may be based on the power of the guaranteed signals that is measured using optical components and monitoring circuitry 92.

Figure 13:
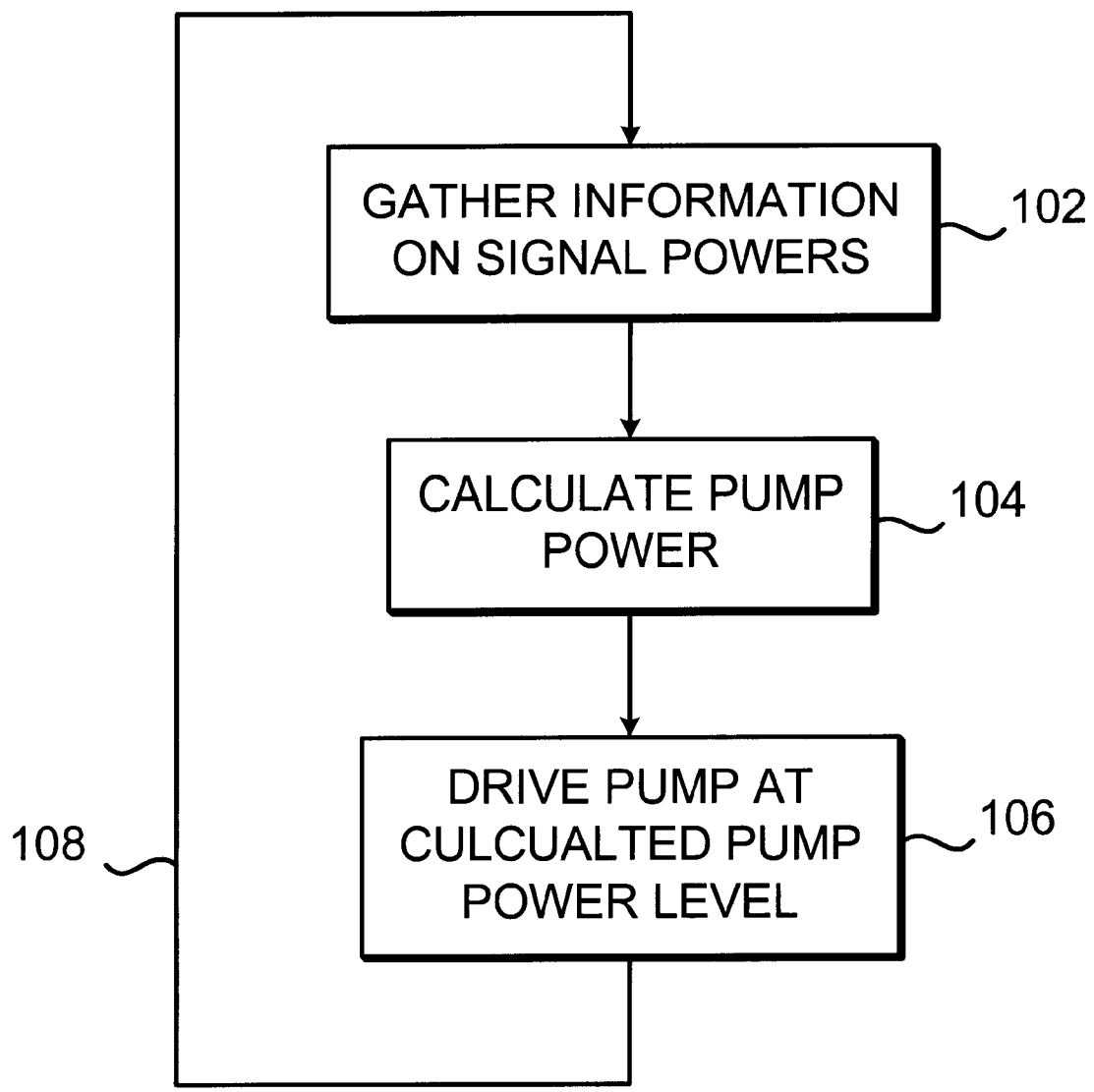
FIG. 13 is a flow chart of illustrative steps involved in controlling gain transients in amplifier equipment in accordance with the present invention.

Illustrative steps involved in controlling equipment such as the Raman pump equipment 20 and amplifiers 18 with gain stages 74 to control gain transients are shown in FIG. 13.

At step 102, information on signals powers is gathered. For example, control unit 28 may use suitable optical components and monitoring circuitry to measure the power of the guaranteed signals and, if desired, the total optical signal power.

At step 104, the pump power for the appropriate pump (pump 26 or pump 82) may be calculated using feed-forward control techniques, using feedback control techniques, or using hybrid control techniques, as described in connection with equations 1–6.

At step 106, control unit 28 may drive the appropriate pump at the calculated pump power level.

As shown by line 108, the steps of FIG. 13 may be repeated in a loop. The speed at which the steps in the loop are performed may be determined by the capabilities of the control electronics in control unit 28. The control electronics should generally be selected to operate as rapidly as possible within cost constraints.

It will be understood that the foregoing is merely illustrative of the principles of this invention, and that various modifications can be made by those skilled in the art without departing from the scope and spirit of the invention.

What is claimed is:

1. Raman pump equipment for a distributed Raman amplifier in a fiber-optic communications link having a span of transmission fiber, wherein the span of transmission fiber carries optical signals on channels at different wavelengths, wherein the optical signals include guaranteed signals that are always present when the communications link is operating normally, comprising:

a Raman pump source that produces Raman pump light at a pump power that optically pumps the transmission fiber to produce Raman gain for the optical signals on the fiber;

optical components and monitoring circuitry that measure the power of the guaranteed signals after the guaranteed signals pass through the transmission fiber;

a control unit that controls the pump power of the Raman pump source based on the measured power of the guaranteed signals to suppress transients in the Raman gain; and optical monitoring equipment for monitoring the total power of the optical signals after the optical signals have been carried over the span of the transmission fiber, wherein the control unit is configured to control the pump power of the Raman pump source by using feedback control based on the measured power of the guaranteed signals and using feed-forward control based on the monitored total power of the optical signals.

2. The Raman pump equipment defined in claim 1 wherein the guaranteed signals are carried on a single one of the channels.

3. The Raman pump equipment defined in claim 1 wherein the guaranteed signals are carried on a plurality of channels in a given band.

4. The Raman pump equipment defined in claim 1 wherein the optical components and monitoring circuitry include a filter for filtering the guaranteed signals from the optical signals.

5. The Raman pump equipment defined in claim 1 wherein the optical components and monitoring circuitry include a fiber-Bragg-grating filter for filtering the guaranteed signals from the optical signals.

6. The Raman pump equipment defined in claim 1 wherein the optical components and monitoring circuitry include a tap for tapping the optical signals, a filter, a circulator for directing the tapped optical signals to the filter, wherein the filter filters the guaranteed signals from the optical signals.

7. The Raman pump equipment defined in claim 1 wherein the guaranteed signals include signals from at least one normal data channel.

8. The Raman pump equipment defined in claim 1 wherein the guaranteed signals include signals from only a single data channel.

9. Raman pump equipment for a distributed Raman amplifier in a fiber-optic communications link having a span of transmission fiber, wherein the span of transmission fiber carries optical signals on channels at different wavelengths, wherein the optical signals include guaranteed signals that are always present when the communications link is operating normally, comprising:

a Raman pump source that produces Raman pump light at a pump power that optically pumps the transmission fiber to produce Raman gain for the optical signals on the fiber;

optical components and monitoring circuitry that measure the power of the guaranteed signals after the guaranteed signals pass through the transmission fiber;

a control unit that controls the pump power of the Raman pump source based on the measured power of the guaranteed signals to suppress transients in the Raman gain; and optical monitoring equipment for monitoring the total power of the optical signals after the optical signals have been carried over the span of transmission fiber, wherein the control unit is configured to control the pump power of the Raman pump source based on the measured power of the guaranteed signals and the monitored total power of the optical signals.

10. A method for controlling gain transients in Raman pump equipment in a distributed Raman amplifier in a fiber-optic communications link having a span of transmission fiber, wherein the span of transmission fiber carries optical signals on channels at different wavelengths, wherein the optical signals include guaranteed signals that are always present when the communications link is operating normally, comprising:

optically pumping the transmission fiber at a Raman pump power to produce Raman gain for the optical signals on the fiber;

measuring the power of the guaranteed signals after the guaranteed signals pass through the transmission fiber;

monitoring the total power of the optical signals after the optical signals have been carried over the span of transmission fiber; and using a hybrid control technique to control the Raman pump power to suppress transients in the Raman gain based on the power of the guaranteed signals and the monitored total power of the optical signals.

11. The method defined in claim 10 further comprising controlling the Raman pump power to maintain the power of the guaranteed signals at a desired level.

12. The method defined in claim 10 further comprising:

controlling the Raman pump power to maintain the power of the guaranteed signals at a desired level; and setting the desired level based on information on the desired level that is provided by a network control and management system.

13. The method defined in claim 10 further comprising:

determining the Raman gain based on the measured power of the guaranteed signals; and controlling the pump power of the Raman pump source to maintain the Raman gain at a desired level.

14. The method defined in claim 10 further comprising:

determining the Raman gain based on the measured power of the guaranteed signals;

controlling the pump power of the Raman pump source to maintain the Raman gain at a desired level; and setting the desired level based on information on the desired level that is provided by a network control and management system.

15. The method defined in claim 10 wherein the guaranteed signals are carried on a single one of the channels.

* * * * *